US005683526A

United States Patent [19]

Guilmette et al.

[11] Patent Number: 5,683,526

[45] Date of Patent: Nov. 4, 1997

[54] METHOD AND APPARATUS FOR HOLDING WALL PANEL AGAINST ADHESIVE

[75] Inventors: Bruce T. Guilmette, Ortonville; N. Keith Merser, North Branch; Glen P. Lloyed, West Bloomfield, all of Mich.

[73] Assignee: Foamseal, Inc., Oxford, Mich.

[21] Appl. No.: 517,384

[22] Filed: Aug. 22, 1995

Related U.S. Application Data

[63] Continuation-in-part of Ser. No. 380,391, Jan. 30, 1995, Pat. No. 5,617,698.

[51] Int. Cl.[6] ........ B29C 65/48

[52] U.S. Cl. ........ 156/71; 52/749.1; 156/91; 156/92; 156/285

[58] Field of Search ........ 156/71, 91, 285, 156/295, 92; 52/749.1, 584.1, 127.1, 127.2

[56] References Cited

U.S. PATENT DOCUMENTS

| | | | |
|---|---|---|---|
| 3,047,165 | 7/1962 | Hutchinson | 214/1 |
| 3,065,550 | 11/1962 | Pattiani | 33/194 |
| 3,375,312 | 3/1968 | Hart | 264/272 |
| 3,787,544 | 1/1974 | Barnette | 264/69 |
| 3,856,291 | 12/1974 | Nilsen | 269/22 |
| 4,065,540 | 12/1977 | Okami | 264/278 |
| 4,083,156 | 4/1978 | Tye | 52/127 |
| 4,124,424 | 11/1978 | Preston | 156/155 |
| 4,148,471 | 4/1979 | Werner | 269/321 |
| 4,242,292 | 12/1980 | Mercer et al. | 264/16 |
| 4,547,255 | 10/1985 | Yow | 156/580 |
| 4,567,821 | 2/1986 | McDonald | 100/100 |
| 4,824,004 | 4/1989 | Hanson | 227/152 |
| 4,927,479 | 5/1990 | Böck | 156/228 |
| 5,053,179 | 10/1991 | Masui et al. | 264/257 |
| 5,121,540 | 6/1992 | Dykstra | 29/772 |
| 5,234,204 | 8/1993 | Hunt | 269/41 |
| 5,552,095 | 9/1996 | Merser | 156/285 |

*Primary Examiner*—Daniel Stemmer
*Attorney, Agent, or Firm*—Howard & Howard

[57] ABSTRACT

A clamp holds a wall panel against an adhesive bead on a wall frame support assembly as the adhesive bead cures. The clamp is actuated to secure the clamp to the support assembly adjacent the panel and hold the panel against the adhesive bead as the bead cures. In a preferred embodiment, the clamp includes a clamping portion having vacuum chambers and a reference surface. A vacuum is drawn on the vacuum chamber, thereby pulling the edges of abutting panels against the reference surface, drawing adjacent panel edge portions of the panels in the parallel relation. The clamping portion also includes a mechanical control which secure the clamping portion to the support assembly holding the panels against the adhesive in coplanar relation. In a method according to this invention polymer adhesive is applied to coplanar surfaces of support members. A clamp is placed adjacent a panel and actuated to hold the panel against the first surface of the clamp. Securement structure is then actuated to hold the clamp and panel at a desired location as the adhesive cures.

13 Claims, 5 Drawing Sheets

Fig - 2
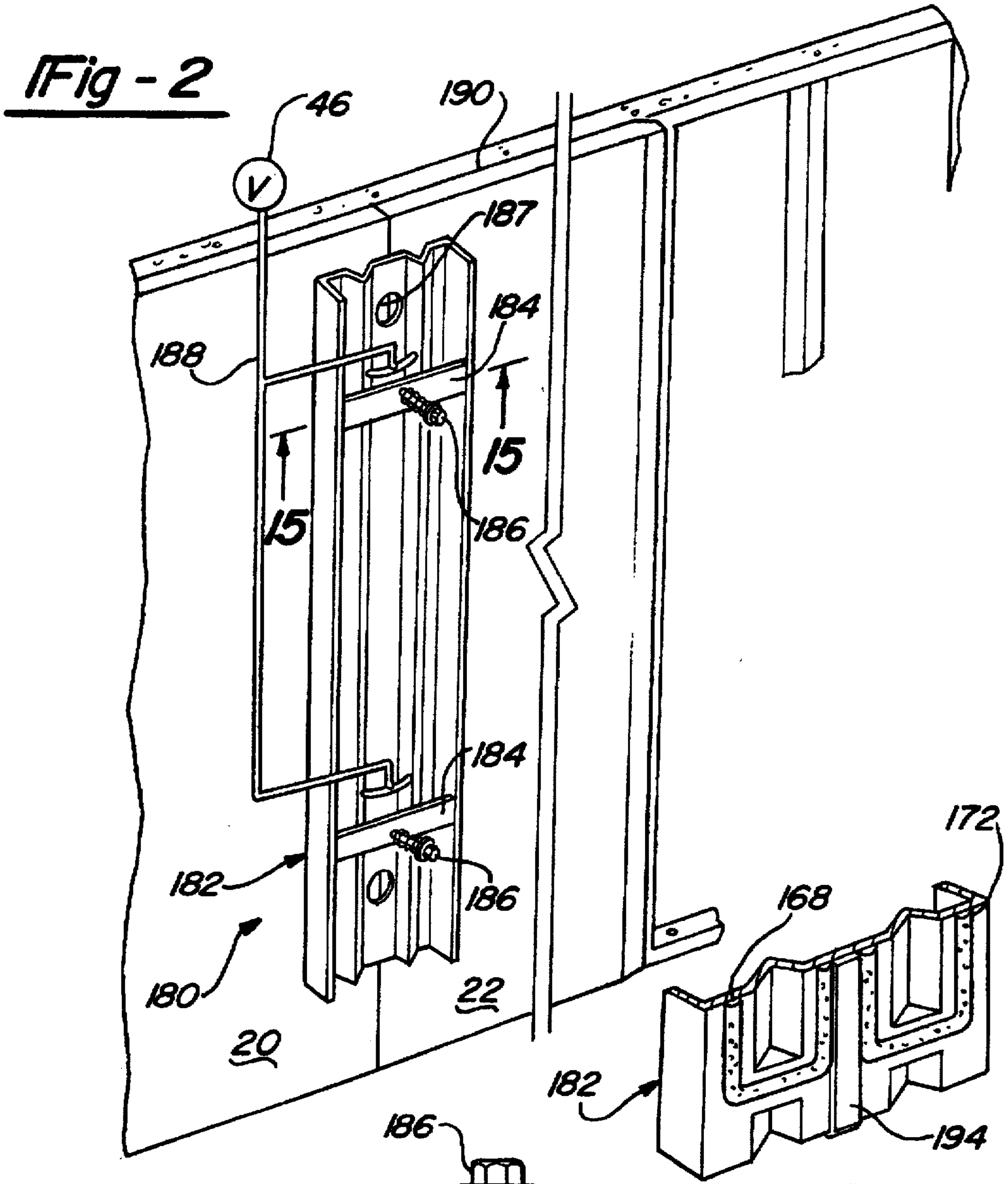
Fig - 3
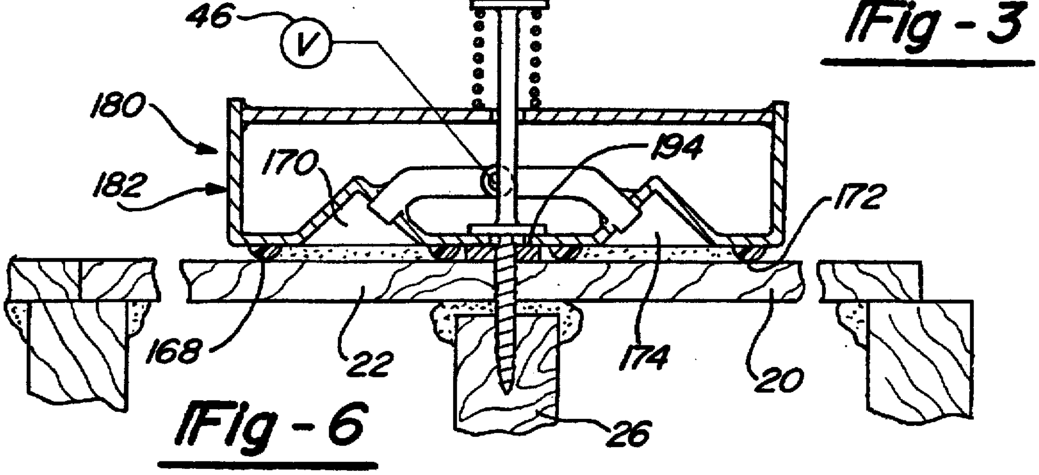
Fig - 6

Fig-8
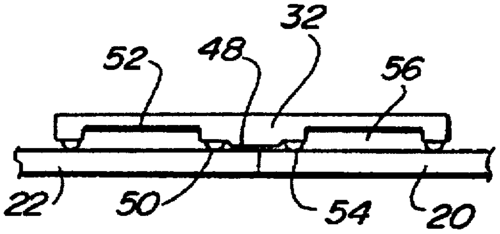
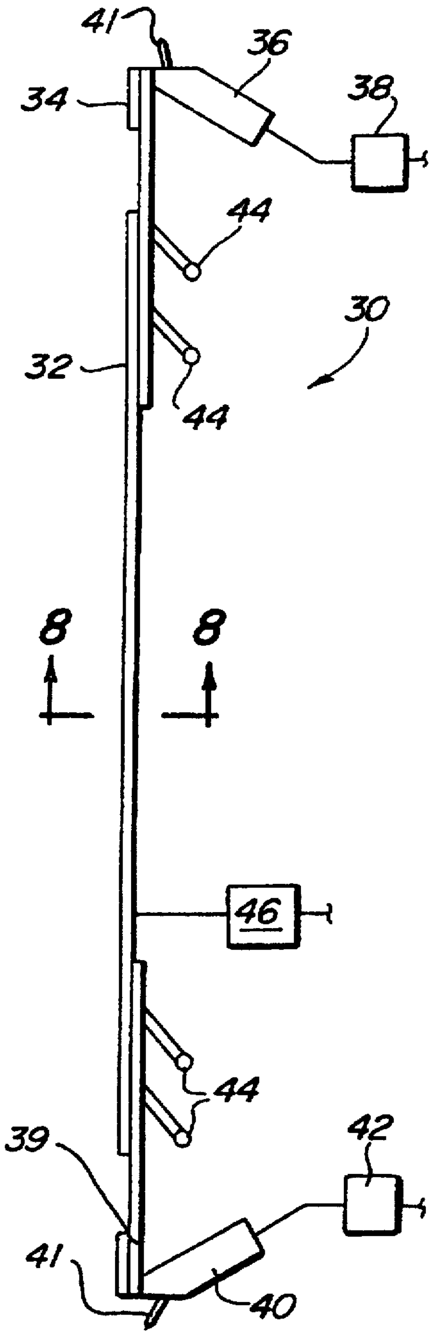
Fig-7
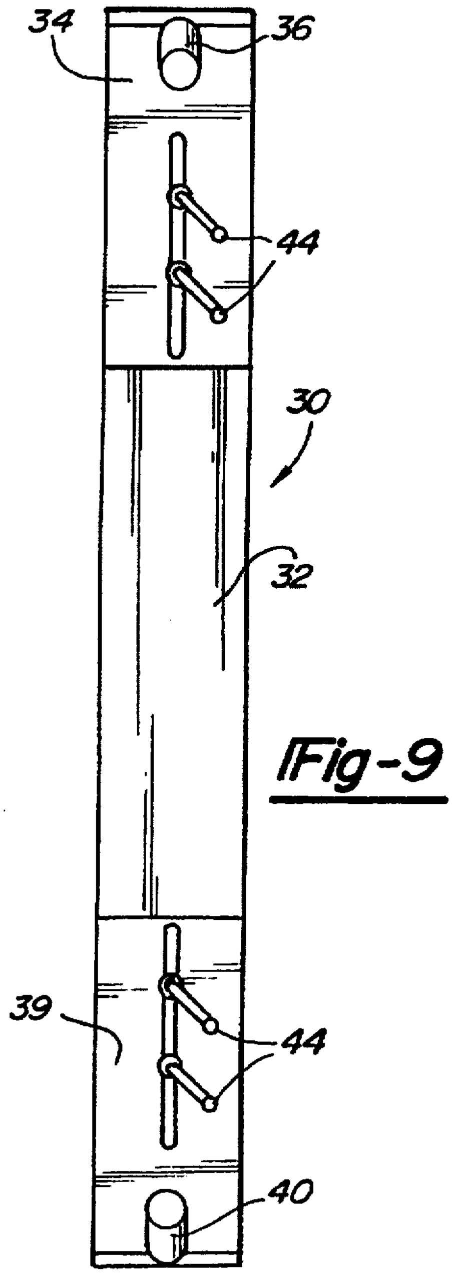
Fig-9

METHOD AND APPARATUS FOR HOLDING WALL PANEL AGAINST ADHESIVE

This application is a continuation-in-part application of application Ser. No. 08/380,391, filed on Jan. 30, 1995, now U.S. Pat. No. 5,617,698.

BACKGROUND OF THE INVENTION

This application relates to a clamp for holding wall, ceiling or floor panels against support members, such as studs, trusses or joists, with an adhesive, to allow the adhesive to cure and secure the wall panel to a structure in substantially coplanar edge to edge alignment.

Recently, foamable adhesives have been used to secure wall and ceiling panels to support members in structures. As an example, many homes are now constructed by building wall frames including the wall stud members, then placing an adhesive on the frames. Wall panels are then held against the adhesive, and the adhesive cures securing the panel to the frame. This method is particularly well suited to the securement of relatively flexible structural panels formed of gypsum sheet rock, or panels typically known as drywall. The use of the adhesive does not create as much damage to the panel as occurs with nailing and eliminates nail-popping. Moreover, the panels are secured much more easily and quickly than with nailing.

Even so, with the use of the adhesive, some challenges arise in holding the panel against the studs while the adhesive cures and the adjacent edges are typically not coplanar. The prior art has typically used various types of bracing; however, the bracing itself will sometimes leave marks on the panel, thus defeating one of the benefits of using the adhesive. Further, the use of the bracing is time consuming, and not always as effective as desirable.

The prior art has proposed a mechanically actuated brace member that is adjusted to hold the panel against the adhesive. That prior suggestion is somewhat deficient, however, since the device requires manual adjustment of the clamp members to secure the clamp, and then to hold the panel against the wall stud. The setup is thus too time consuming, and these braces would not be practical. Further, such braces do not typically provide full compression of the adjacent edges of the panels, resulting in uneven noncoplanar surfaces which must be sanded, caulked or covered.

SUMMARY OF THE INVENTION

In one broad aspect of this invention, a clamp for holding a panel against an adhesive on a wall frame includes a holding member and a control that applies a force to hold the panel in a position where it is secured against support members by an adhesive. In one aspect of this invention, the clamp includes two vacuum chambers that are positioned on two adjacent panels near the adjacent edges of the two panels. As has been previously explained in U.S. patent application Ser. No. 08/089,726, now U.S. Pat. No. 5,552, 095, there are sometimes difficulties in properly aligning the edges of two adjacent panels. This has resulted in an undesirable appearance at the edge, and further requires patching and taping to reduce the discontinuity at the edge. In the above-referenced application, panels being built for pre-constructed homes are placed on a vacuum table and the edges are brought into a position where they will be aligned.

The present invention discloses a clamp that is secured adjacent the edges of the two panels, and includes two vacuum chambers which draw edges of the panel against a flat surface. The flat surface insures that the edges are in abutting coplanar position as the adhesive cures to secure the panel. The vacuum chambers do not draw the panel for such an amount that the panel moves away from the adhesive. In that sense, the clamp "holds" the panel at a position where it is against the adhesive, insuring that the panel will be properly secured to the structure as the adhesive cures.

In one preferred embodiment of this invention, the clamp comprises a clamping portion having a first surface to be placed in contact with edge abutting wall panels, a fluid control for applying a fluid force to hold the panels against the first surface and a securement structure to secure the clamp to a location adjacent the panels. The clamping portion may include one or more, preferably a pair of vacuum chambers which extend substantially the entire length of the clamping portion. A gasket preferably surrounds each vacuum chamber. A source of vacuum is actuated which applies from about 5 to 15 inches Hg vacuum to each of the vacuum chambers. A reference surface is disposed between the vacuum chambers and the source of vacuum draws the abutting edges of the panels against the reference surface. A securement structure, preferably comprising a plurality of spaced screws secures the clamp to a location adjacent the panels, holding the panels against the adhesive while the adhesive cures.

In other embodiments of this invention, several clamps are disclosed which include pusher members that receive a hydraulic or pneumatic force to force a surface against the panel. The surfaces hold the panel against the adhesive. These clamps also preferably include some structure for securing the clamp to the structure adjacent the panel. In one embodiment, angled cylinders are utilized adjacent the top and bottom of the clamp. Those cylinders carry screws that are driven into surfaces to hold the clamp. In another embodiment of this invention, the securement structure is a suction cup fixed to the clamp for holding the clamp to the wall panel. In this embodiment, the suction cup ensures that the clamp stays in position adjacent the panel while the pusher member insures that the panel is held against the adhesive. It should be understood that there is some tolerance in the exact position of the panel against the adhesive. Thus, the fact that the suction cup may tend to pull the panel slightly away from the wall at the same time the pusher member is pushing the panel against the wall still results in a panel that is properly secured to the wall.

In another embodiment of this invention, the clamp includes a mechanical control which pushes a clamping portion of the clamp against the panel. The control may also help secure the clamp adjacent the panel. One clamp embodiment includes a plurality of lateral members, two truss members and a base. In another embodiment, the clamp includes a pair of arms hingedly connected to a clamping portion of the clamp. The arms are hingedly connected to each other and one of these arms includes a locking hinge. When the locking hinge is actuated, the clamp is held against the panel while the adhesive cures. The embodiments containing a mechanical control preferably also include a fluid control such as vacuum chambers which help maintain the panels in a desired location.

In a method according to this invention, a wall panel is secured to a structure by placing adhesive around the frame that is to hold one or a plurality of wall, ceiling or floor panels. The wall panel is then placed on the frame. A clamp is then actuated to provide a force holding the panel in a location where it is in contact with the adhesive as the adhesive cures. In one embodiment, this method includes applying a vacuum on the panel to pull the panel to a desired location. In other embodiments, the method includes actuating a mechanical control such as a locking hinge which holds the panel in the desired location.

In any of the embodiments, appropriate controls are required to insure that the sequence of operation of the securement structure and the controls are as desired. Preferably, the clamp includes mechanical control structure that holds the panel against the adhesive while the adhesive cures. Most preferably, the clamp includes fluid control structure that ensures the clamp is initially secured to the structure or the panel, and the pusher member or vacuum chamber is then actuated to hold the panel at the desired location.

These and other features of the present invention will be best understood from the following specification and drawings, of which the following is a brief description.

BRIEF DESCRIPTION OF THE DRAWINGS

FIG. 2 is a perspective view of a clamp embodiment in use.

FIG. 3 is a partial perspective view of the lower end of the clamp of FIG. 2.

FIG. 6 is a cross-sectional view of the clamp of FIG. 4 after complete attachment to the structural panel assembly.

FIG. 7 is a partially schematic view of another clamp embodiment.

FIG. 8 is a cross-sectional view showing the clamp of FIG. 7 along view lines 8—8.

FIG. 9 is a rear elevation view of the clamp shown in FIG. 7.

DETAILED DESCRIPTION OF A PREFERRED EMBODIMENT

Figure 1:
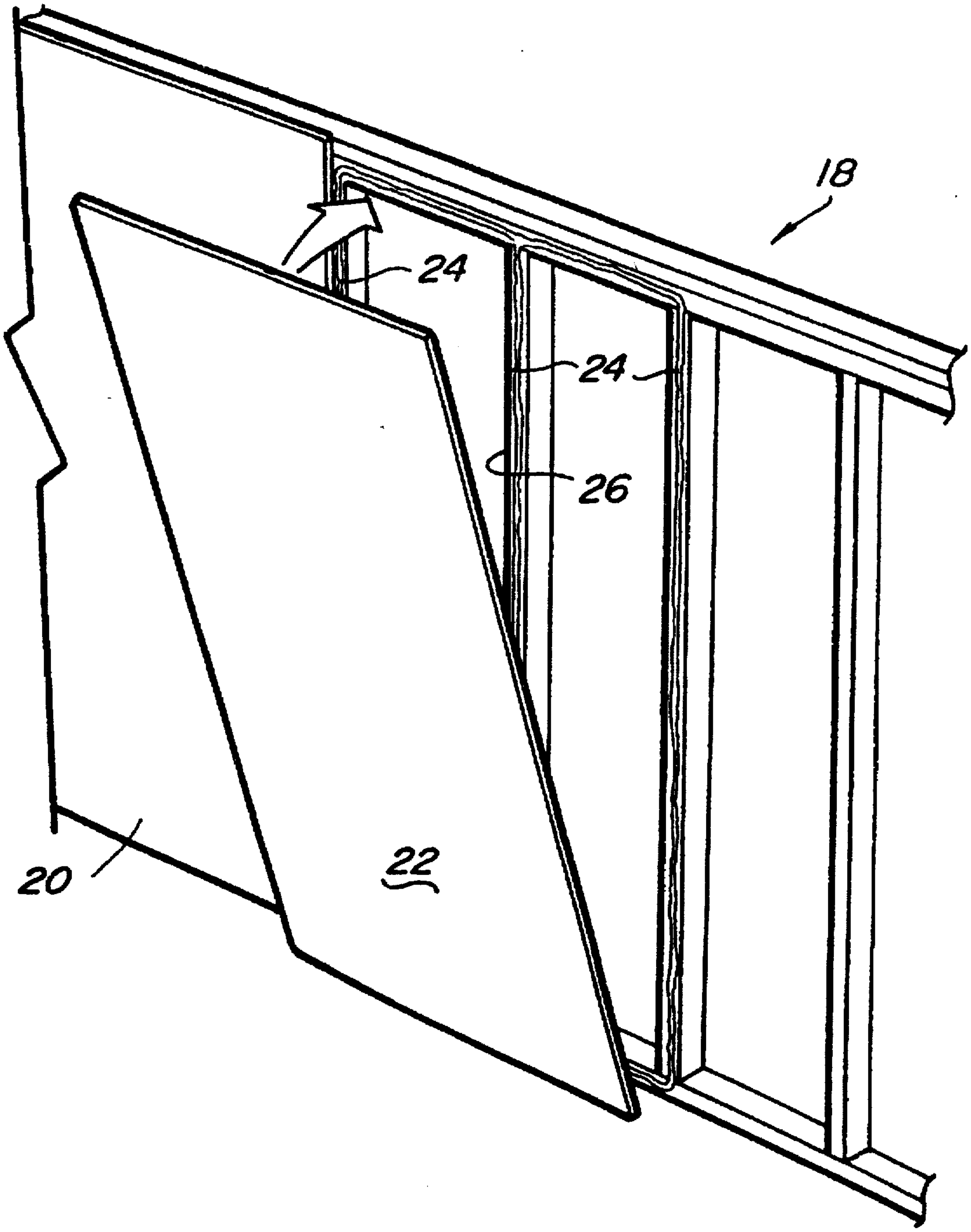
FIG. 1 shows a support assembly receiving a wall panel.

FIG. 1 shows a wall support assembly 19 receiving a wall panel 22 forming a structural wall panel assembly 18 comprising support assembly 19 and a series of wall panels 20 and 22. As will be understood by those skilled in construction, the apparatus and methods of this invention may also be utilized in the construction of ceiling and floor panel assemblies. For ease of description, however, a wall construction will be described. As is known, an adhesive bead 24 is placed along wall studs 26 that are to receive the panels 20 and 22. Wall studs 26 forming support assembly 19 are in spaced, generally parallel fashion and have coplanar surfaces. As discussed above, the use of a liquid curable polymeric adhesive, particularly a foamable resin adhesive to secure the wall panels, provides several valuable benefits. This invention provides an efficient, automatic means of holding panels against adhesive 24 as the adhesive cures. The foamable resin adhesive useful in the present invention includes one- or two-component polyerathane foamable resins of the type described in our copending U.S. patent application Ser. No. 08/014,440, the disclosure of which is incorporated herein by reference.

The present invention could be broadly described as using a force to hold a panel, or more preferably a plurality of panels, at desired locations against the support members of a support assembly as the adhesive cures. In one preferred embodiment, fluid may be air drawn away to create a vacuum, thus drawing the panels to desired locations. Additionally, a mechanical force may be applied to push the clamp against the panel and hold the panel against the adhesive. The mechanical force is used in combination with, e.g., a vacuum to hold the panel against the adhesive at a desired location.

FIG. 2 illustrates a preferred clamp embodiment according to the present invention. Clamp 180 includes a clamping portion 182. Brackets 184 support screws 186 which may be spring loaded to bias screws 186 away from panels 20 and 22 during use. A source of vacuum 46 is connected to two independent vacuum chambers of clamp 180 through line 188. The vacuum chambers of clamp 180 run substantially the entire length of clamping portion 182. Clamp 180 also has view holes 187 which allow an operator to position clamp 180 over wall panels 20 and 22 such that seam 190 runs along a central vertical axis of clamp 180. Clamp 180, thus, is positioned about the abutting edges of panels 20 and 22.

As shown in FIG. 3, at the ends of vacuum chambers 170 and 174 terminate with end pieces 171 and 173, respectively, which separate vacuum chambers 170 and 174 from atmosphere. Gasket 172 is formed adjacent panel 20, which surrounds vacuum chamber 174. Similarly, gasket 168 surrounds vacuum chamber 170 which is placed about panel 22. Thus, vacuum source 46 is able to draw a vacuum in vacuum chambers 170 and 174 through line 188 by virtue of gaskets 168 and 172 and end pieces 171 and 173.

Figure 4:
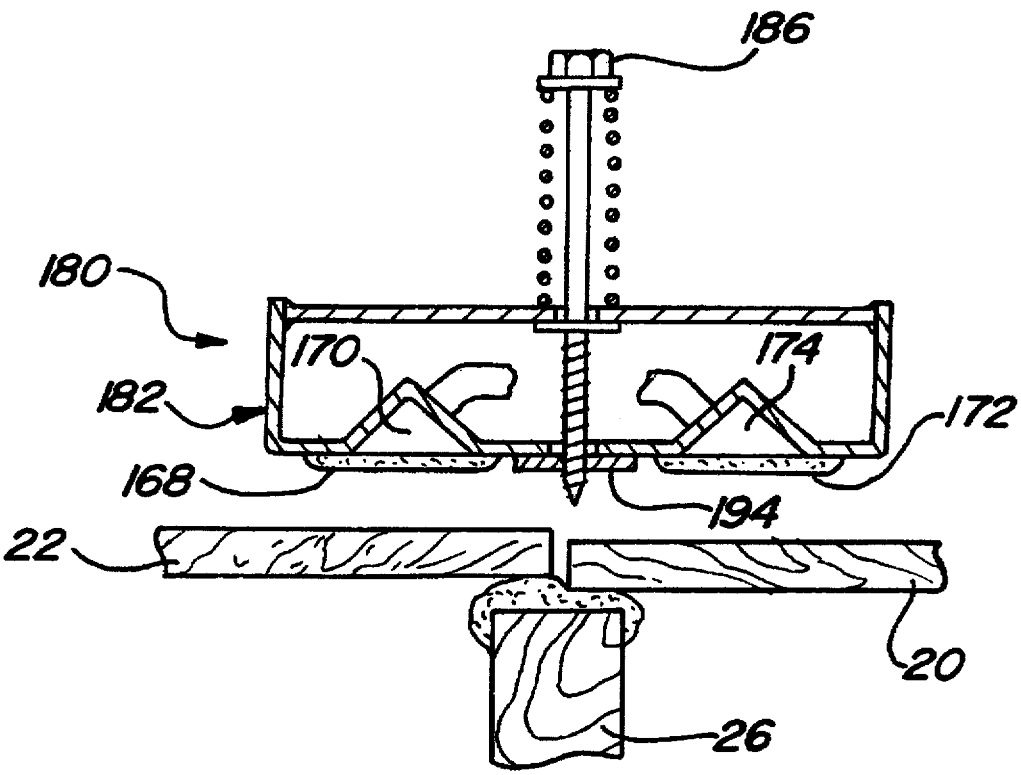
FIG. 4 is a cross-sectional view of a structural panel assembly and a clamp according to the present invention prior to attachment to the structural panel assembly.
Figure 5:
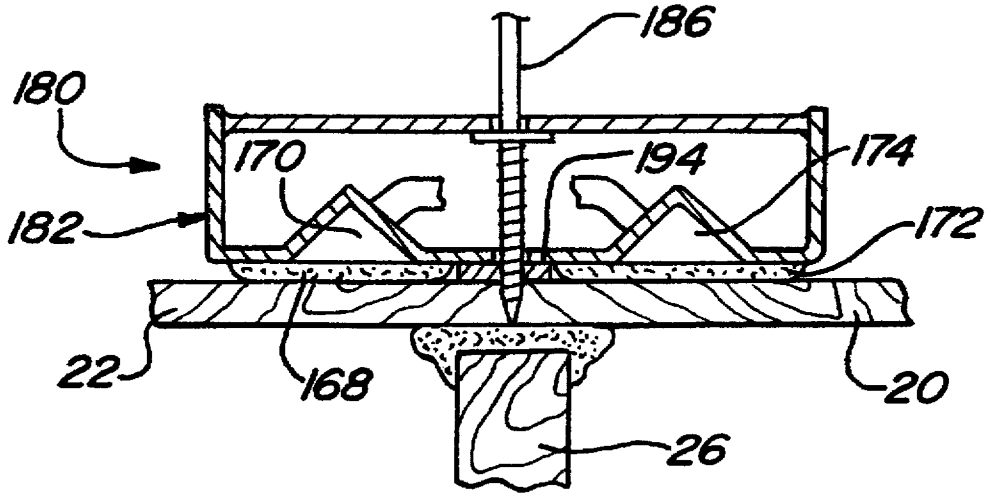
FIG. 5 is a cross-sectional view of the clamp of FIG. 4 after partial attachment to the structural panel assembly.

FIGS. 4-6 show clamp 180 in use. An adhesive 24 is applied to wall studs 26 along the coplanar surfaces of studs 26. Panels 20 and 22 are positioned onto studs 26 over adhesive 24. Preferably, panels 20 and 22 are positioned in abutting edge-to-edge, generally coplanar relation. Preferably, abutting edge portions 200 and 202 of panels 20 and 22 bridge surfaces 25 of stud 26, because wall panels are relatively flexible and are often warped, the abutting edges 200 and 202 of wall panels 20 and 22, respectively, do not typically align to form a smooth exposed seam. Spring 185 biases screw 186 outwardly. As shown in FIG. 5, clamping portion 182 is positioned about the abutting edges of panels 20 and 22 adjacent seam 190 formed by the abutting edges of panels 20 and 22. View holes 187 allow an operator to centrally position clamp 180 over seam 190 of panels 20 and 22. The operator preferably holds clamp 180 during this process. Vacuum is drawn on vacuum chambers 170 and 174, thereby drawing panels 20 and 22 against reference surface 194 to draw edge portions 200 and 202 of panels 20 and 22 into parallel relation. This provides a smooth seam adjacent the abutting edges of panels 20 and 22. Abutting edges 200 and 202 of panels 20 and 22 are drawn slightly away from wall stud 26. Screw 186 is then driven through panels 20 and 22, preferably through seam 190, to wall stud 26 to secure clamp 180 in position against panels 20 and 22. As shown in FIG. 6, wall panels 20 and 22 are pushed back toward wall stud 26 to a position where there is a slight gap between wall panels 20 and 22 and wall stud 26. Clamp 180 thus drives panel edge portions 200 and 202 toward stud 26, forming edge portions 200 and 202 into coplanar relation. Adhesive 192 fills this gap and bonds wall panels 20 and 22 to stud 26.

In a preferred method of using the clamp embodiment 180, the clamp 180 is initially placed adjacent to edge abutting panels 20 and 22 which are to be held against wall studs 26. Clamp 180 is then centrally positioned over seam 190 by centrally positioning seam 190 within view holds 187. Vacuum source 46 is then actuated and a vacuum is drawn on chambers 170 and 174. The fluid force of the vacuum draws panels 20 and 22 slightly away from wall studs 26, with the edges of panels 20 and 22 drawn against reference surface 194, thereby providing a smooth aligned seam between panels 20 and 22 with edge portions 200 and 202 in parallel relation. Screws 186 are driven through a panel, preferably through seam 190 formed by the abutting edges of panels 20 and 22. Screws 186 hold clamp 180 in position and may push panels 20 and 22 toward studs 26. It should be understood that clamp 180 holds the abutting edges of panels 20 and 22 in coplanar relation in a desired location to provide a smooth seam between panels 20 and 22. Panels 20 and 22 are then held against the adhesive as the adhesive cures. Thus, clamp 180 holds panels 20 and 22 at a location where adhesive 192 bonds panels 20 and 22 to wall stud 26 while providing a smooth seam along the abutting edges of panels 20 and 22.

In another preferred method, a series of clamps are used in a method described above to secure a plurality of panels having abutting edges to wall studs in a structure, one after another to construct an entire wall structure. A first clamp is used to secure a first and second panel having abutting edges to a wall stud in a structure, as described above. A second clamp is then used to secure a third panel having an abutting edge with the second panel to a wall stud, in a similar manner described above. Alternatively, once the adhesive has cured to hold the first and second panels to the wall studs, the first clamp is used to secure the third panel to the wall stud with an abutting, generally coplanar edge with the second panel.

FIG. 7 shows a first embodiment clamp 30. Clamp 30 includes a clamping portion 32 at the vertical center of the clamp 30. Clamping portion 32 is placed about the abutting edges of panels 20 and 22. An upper securement portion 34 includes an angled motor 36 which receives a control signal 38. Similarly, a bottom securement portion 39 receives angled motor 40 which is also connected to a control 42. Motors 36 and 40 may drive a screw 41 into the floor and ceiling to secure clamp 30. Vacuum connections are made between central portion 32 and a source of a vacuum 46 and also to appropriate fluid controls. Locking handles 44 allow adjustment of the relative position of the upper and bottom portion relative to the central portion.

As shown in FIG. 8, central portion 32 is preferably positioned about the abutting edges of the panels 20 and 22. The panels 20 and 22 are typically drywall, and are often low cost items. Their edges are often warped or out of alignment from each other. Thus, in the past there have been problems in obtaining a smooth edge at the abutting edges 20 and 22. The present invention creates a vacuum to draw the panels 20 and 22 against a reference surface 48 to provide a smooth abutting edge or seam 90 between the abutting edges of panels 20 and 22. This reduces, or eliminates, subsequent taping usually required to produce a smooth edge of panels 20 and 22.

As shown, the central portion 32 includes a reference abutting surface 48 which is placed over the adjacent edges. A gasket 50 is formed adjacent one of the panels, here 22. Gasket 50 surrounds a vacuum chamber 52 that is placed about one of the panels, here 22. Although it cannot be seen from this figure, it should be understood that vacuum chamber 22 will be defined by the perimeter of gasket 50. Similarly, gasket 54 defines a vacuum chamber 56, here shown on panel 20. When clamp 30 is in use, it is placed about the edges of adjacent panels 20 and 22. The motors 36 and 40 are actuated to hold the clamp 30 against the ceiling and floor of the structure. The vacuum source 46 is then actuated and a vacuum is drawn in chambers 52 and 56. The fluid force of the vacuum draws panels 22 and 20 slightly away from wall studs 26, with the edges of the panels 20 and 22 drawn against the reference surface 48. Thus, smooth abutting edges are achieved by holding the edges of both panels against the reference surface 48 in coplanar relation. It should be understood that the panels 22 and 20 are only drawn slightly away from the wall studs 26, but they are still held at a location which is within a range of tolerance still holding the panels 20 and 22 against the adhesive bead 24. Thus, not only are the edges held in a desired location to provide a smooth joint between the panels 20 and 22, but at the same time, the panels 20 and 22 are still held against the adhesive as the adhesive cures.

As shown in FIG. 9, locking handles 44 at the rear of clamp 30 allow the upper securement portion 40 and bottom securement portion 39 to be moved relative to adjust the total height of clamp 30. The locking handles are shown schematically, and any known guiding and locking structure may be used to adjust the height of clamp 30.

In a method according to this invention, a liquid curable polymeric adhesive 24 is applied to the coplanar surfaces of spaced, generally parallel support members 26 forming a wall support assembly. A pair of relatively flexible, fibrous panels are located over the coplanar surfaces of wall studs 26 forming the wall support assembly in generally coplanar relation with adjacent edge portions of panels 20 and 22 in generally abutting relation. The adjacent edges of panels 20 and 22 bridge wall stud 26. Clamp 30 is positioned adjacent a pair of wall panels 20 and 22. A mechanical control, here motors 36 and 40, is actuated to hold the clamp 30 against support assembly 19. A vacuum is then drawn in the chambers 52 and 56, drawing the panels 22 and 20 at their edges against the reference surface 48. The clamp is then held in this position, holding the panels 22 and 20 in coplanar relation against the adhesive as the adhesive cures.

Various known fluid circuit control members could be incorporated into the several embodiments as would be well within the scope of workers of ordinary skill in the art. The details of the fluid controls form no portions of this invention. Rather, it is the use of the inventive arrangements of the clamp members, and the inventive method of using the clamp members which is the inventive aspect of this application. In addition, any type of fluid power could be utilized; i.e., the cylinders could be either pneumatic or hydraulic.

In addition, for all embodiments, including those which utilize a rotating motor to drive a securement member into the structure, such as those that drive a threaded member into the floor and ceiling, it is also preferable that a control regulate both the securement members and the fluid actuation of either the source of vacuum or the source of fluid pressure. It is also preferred that the securement member be initially actuated automatically to secure the clamp member, and that the fluid force then be actuated to hold the panel at the desired position.

Figure 10:
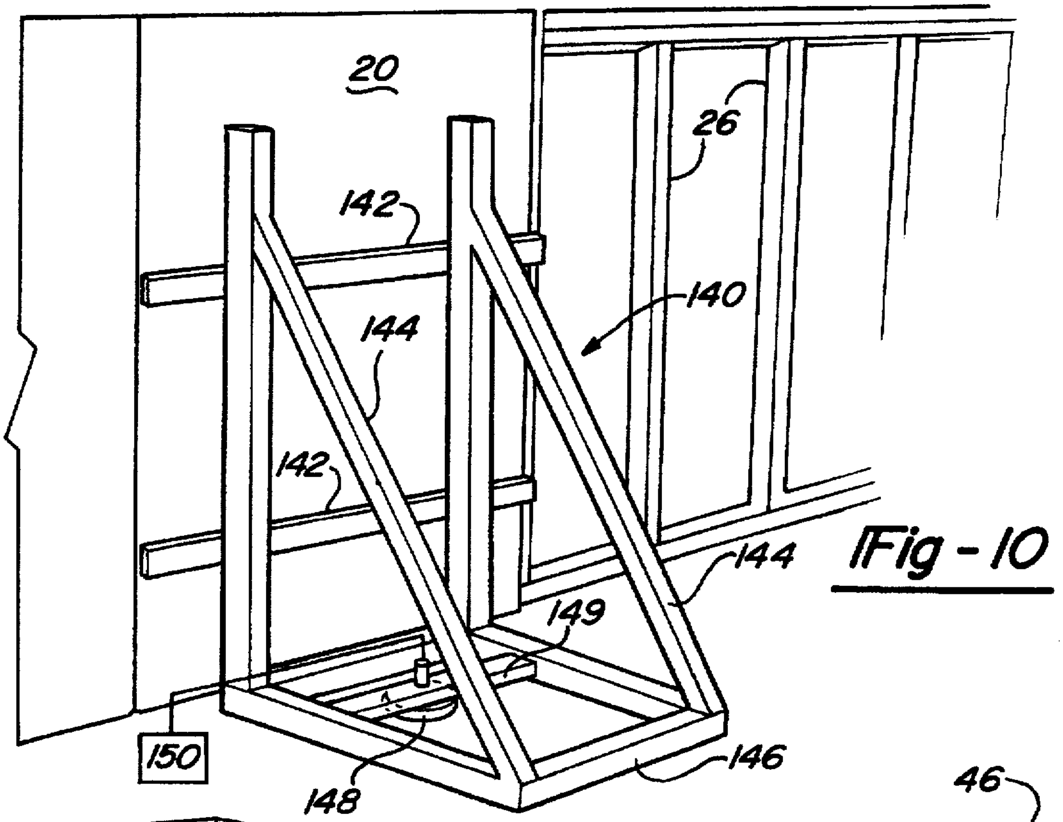
FIG. 10 is a perspective view of another clamp embodiment.

FIG. 10 illustrates an embodiment of a mechanical clamp according to the present invention. Clamp 140 includes lateral members 142, truss members 144 and a base 146. Truss members 144 are secured to and thus support lateral members 142. Lateral members 142 are placed across panel member 20. Lateral members 142 preferably extend across substantially the lateral width of panel 20. Truss members 144 support lateral members 142, which are securely affixed thereto. Base 146 includes a suction cup 148 which is supported on bridging member 149. A source of vacuum 150 is connected to the suction cup 148. When adhesive has been applied to the exposed faces of studs 26, and panel 20 has been positioned over the studs and adhesive, clamp 140 is disposed adjacent panel 20 with lateral members 142 contacting the exposed face of panel 20 and holding panel 20 against the adhesive. A vacuum is drawn on suction cup 148, which is adjacent the floor, thereby holding clamp 140 in position. In a preferred embodiment, truss members 144 may be hinged at an intermediate point along the diagonal arm of truss member 144 and at the vertex of the vertical and horizontal arms of truss members 144. Most preferably, the hinge in the diagonal arms of truss member 144 is of a locking hinge type, described further below, providing additional support of panel 20 against the adhesive on studs 26.

Figure 11:
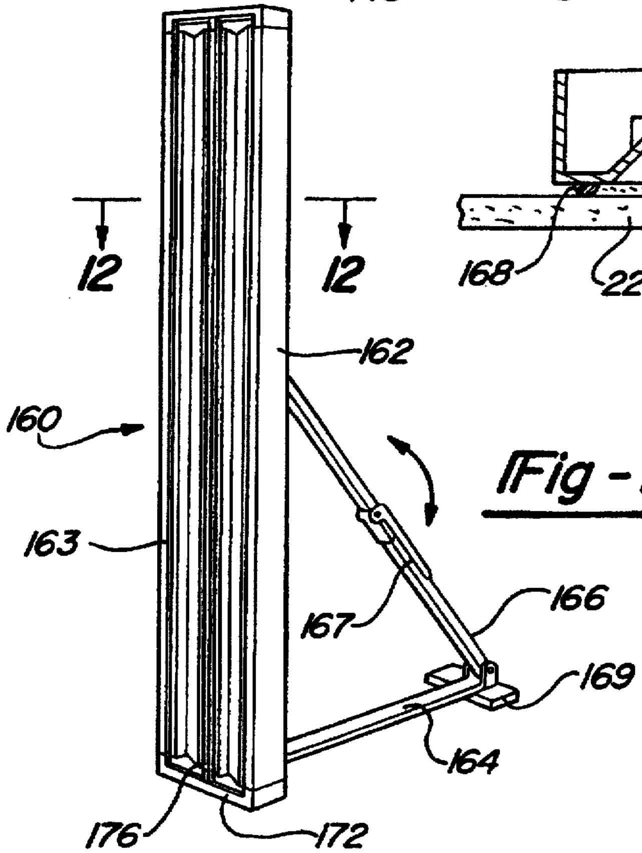
FIG. 11 is a perspective view of yet another clamp embodiment according to the present invention.

FIG. 11 shows another clamp embodiment according to the present invention. Clamp 160 includes a clamping portion 162 and support arms 164 and 166. Clamping portion 162 includes two elongated generally parallel spaced vacuum chambers 170 and 174. Diagonal support arm 166 and horizontal support arm 164 are hingedly connected to a rear face of clamping portion 162, remote from the face which contacts the exposed face of panel 20. Support arms 164 and 166 are hingedly attached to each other in a known manner. In addition, diagonal support member 166 includes a locking hinge 167 intermediate the hinged connections of the diagonal arm 166 to horizontal support member 164 and to clamping portion 162. Locking hinge 167 includes a handle which facilitates the actuation of the mechanical control. To actuate the mechanical control of this clamp embodiment after the panel has been placed against the adhesive on studs 26, clamp 160 is positioned adjacent panel 20. From a folded or semi-folded position, locking hinge 167 is actuated to a locking position (shown in FIG. 11) using the handle. In a locking position, the two halves of diagonal support arm 166 are co-linear and hinge 167 is biased in a locked position, preventing the hinge 167 from folding. The four hinged connections allow the clamp to be folded from the locked position (as shown in FIG. 11) to a storing position in which support members 164 and 166 are adjacent the rear face of clamping portion 162. A pad 169 is preferably provided adjacent the hinged connection between support arms 164 and 166 to prevent marring of the floor.

Figure 12:
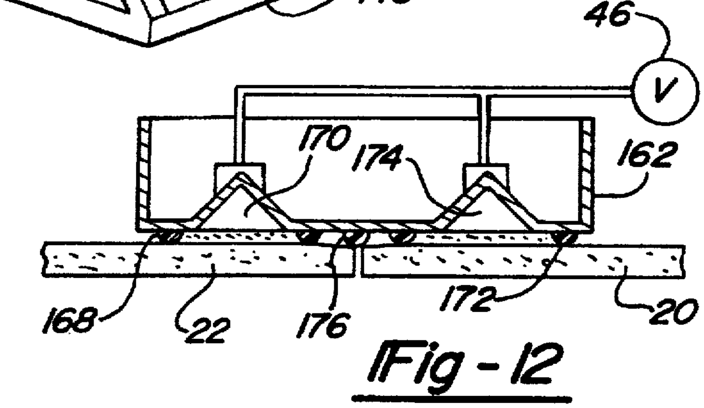
FIG. 12 is a cross-sectional view of the clamp of FIG. 11 along view lines 12—12.

As shown in FIG. 12, clamp 160 also includes a fluid control for holding the panel against the adhesive. Clamping portion 162 is placed adjacent an exposed face of panels 20 and 22, about the abutting edges of these panels. A gasket 168 is formed adjacent panel 22 and surrounds vacuum chamber 170 that is placed about panel 22. Vacuum chamber 170 is defined by the perimeter of gasket 168. Similarly, gasket 172 defines a vacuum chamber 174 on panel 20. Vacuum chambers 170 and 174 preferably extend substantially the entire length of clamping portion 162. As shown, clamping portion 162 includes a reference abutting strip 176 which is placed over the adjacent edges. In the present invention, vacuum source 46 creates a vacuum to draw the panels 20 and 22 against reference strip 176 to provide a smooth abutting edge. Preferably, vacuum source 46 applies from about 5 to 15 inches Hg vacuum to hold panels 20 and 22 against clamping portion 162 and the abutting edges of the panels against strip 176.

When clamp 162 is in use, it may be placed about the edges of adjacent panels 20 and 22. Arms 164 and 166 are extended and locked in place by securing the handle of locking hinge 167 against diagonal support arm 166. This mechanical control drives strip 176 against the adjacent panel edge portions and pushes panels 20 and 22 slightly against the adhesive toward studs 26. Vacuum source 46 is then actuated and a vacuum is drawn in chambers 170 and 174. The fluid force of the vacuum draws panels 22 and 20 slightly away from wall studs 26, with the edges of the panels 20 and 22 drawn against strip 176 to provide a smooth seam along the abutting edges of panels 20 and 22. Thus, as in the clamp embodiment of FIG. 3, panels 20 and 22 are drawn slightly away from wall studs 26, but they are held at a location which is within a range of tolerance still holding panels 20 and 22 in coplanar relation against the adhesive bead.

Several embodiments of this invention have been disclosed. A worker of ordinary skill in the art would recognize, however, that certain modifications would come within the scope of this invention. For example, the clamp embodiments described above could be used in a horizontal fashion with vacuum chambers running horizontally when, for example, the wall, ceiling or floor panels are positioned horizontally across a support assembly. For that reason, the following claims should be studied to determine the true scope and content of this invention.

We claim:

1. A method of securing a wall panel to a wall stud in a structure comprising the steps of:

placing an adhesive on a wall stud in a structure;

placing a panel extending vertically on said adhesive;

placing a clamp adjacent said panel;

actuating a fluid control to hold a first surface of said clamp in contact with said panel, while holding said panel in contact with said adhesive before said adhesive cures; and actuating a control to drive a securing member toward said panel and secure said clamp adjacent said panel while said adhesive cures.

2. A method as recited in claim 1, wherein said clamp comprises a clamping portion including said first surface and said mechanical control includes a first arm and a second arm hingedly connected to said clamping portion remote from said first surface, said first and second arms hingedly connected to each other at a point remote from said clamping portion, and wherein said second arm includes a locking hinge.

3. A method as recited in claim 1, said clamp comprising a clamping portion including a pair of vacuum chambers running substantially the entire length of said clamping portion, wherein actuating said fluid control comprises actuating a source of vacuum in fluid communication with said vacuum chambers, holding portions of said panel against a first surface of said clamping portion.

4. A method as recited in claim 3, said clamp further comprising a gasket surrounding each of said vacuum chambers and wherein actuating said mechanical control comprises driving a plurality of screws into said structure, holding said panels against said adhesive while said adhesive cures.

5. A method as recited in claim 1, said fluid control comprising a source of vacuum, wherein said clamp is positioned across abutting edges of two adjacent panels, said vacuum source drawing edges of each said panel against said first surface such that said edges will generally be in a smooth aligned relationship with each other when said adhesive cures.

6. A method as recited in claim 5, said clamp comprising a clamping portion including a pair of vacuum chambers running substantially the entire length of said clamping portion, a gasket surrounding each of said vacuum chambers and a reference surface located between said vacuum chambers, wherein said reference surface is positioned over abutting edges of said panels with one of each of said vacuum chambers located over one of said panels and said vacuum source draws said edges against said reference surface.

7. A method as recited in claim 1, wherein said securing member is a screw which is driven into one of said wall studs or said panel.

8. A method of securing wall panels to wall studs in a structure comprising the steps of:

placing an adhesive on said wall studs;

placing a first panel and a second panel on said adhesive in abutting edge-to-edge, generally coplanar relation;

securing a clamp adjacent said first and second panels over a seam formed between said first and second panels;

actuating a control to hold a first surface of said clamp in contact with said first and second panels over said seam, while holding said first and second panels in contact with said adhesive as said adhesive cures; and said seam being formed adjacent a wall stud, and said method includes actuating a fluid control comprising a source of vacuum followed by securing a securing member to said wall stud to secure said clamp adjacent said panels, thereby holding said first and second panels against said adhesive and forming said seam having a smooth aligned exposed surface.

9. A method as recited in claim 8, further comprising:

placing a third panel on said adhesive in abutting edge-to-edge, generally coplanar relationship with said second panel, forming a second seam between said second and third panels;

securing a second clamp adjacent said second and third panels over said second seam; and actuating a control to hold a first surface of said second clamp in contact with said second and third panels, while holding said second and third panels in contact with said adhesive as said adhesive cures.

10. A method as recited in claim 8, wherein said securing member is a screw.

11. A method of forming a structural panel assembly comprising a support assembly and a plurality of generally coplanar relatively flexible panels bonded to said support assembly in edge to edge abutting relation by a liquid curable polymer adhesive, said method comprising the following steps:

forming said support assembly including a plurality of spaced generally parallel support members having coplanar surfaces;

applying said liquid polymer adhesive to said coplanar surfaces of said support members;

locating at least two of said panels on said support member surfaces in generally coplanar relation with adjacent edge portions of said panels in generally abutting relation bridging one of said support members surfaces;

locating a clamp having an elongated vacuum chamber defined by a gasket and located over said edge portions of said adjacent panels, and drawing a vacuum in said vacuum chamber, said vacuum drawing said panel edge portions into parallel relation;

driving said panel edge portions against said one support member surface, forming said adjacent panel edge portions in coplanar relation;

curing said adhesive, permanently bonding said adjacent panel edge portions to said one support member surface in coplanar abutting relation; and said clamp including two generally elongated parallel spaced vacuum chambers, each defined by a gasket, said method including locating said clamp over said panel edge portions with a vacuum chamber located over each of said panel edge portions and spaced from said abutting panel edges, then drawing a vacuum in each of said spaced vacuum chambers, and sealing said spaced vacuum chambers from each other, and on each of said panel edge portions and mechanically driving said edge portions against said one support member surface and said polymer adhesive to cure.

12. The method of forming a structural panel assembly as defined in claim 11, characterized in that said clamp vacuum chambers are spaced by a generally flat surface facing said panels, said method including locating said clamp over said panel edge portions with said generally flat surface bridging said adjacent abutting panel edges, then drawing a vacuum in each of said chambers drawing said panel edges against said clamp flat surface in parallel relation, then driving said flat surface against said adjacent panel edge portions and curing said adhesive.

13. The method of forming a structural panel assembly as defined in claim 12, wherein said method includes driving a fastener through said clamp into said one support member, said fastener driving said panel edge portions against said one support member surface.

* * * * *